United States Patent [19]

Kerschbaumer

[11] Patent Number: 4,987,168

[45] Date of Patent: Jan. 22, 1991

[54] THERMOPLASTIC PLASTICIZER-CONTAINING POLYAMIDES

[75] Inventor: Franz Kerschbaumer, Chur, Switzerland

[73] Assignee: EMS-Inventa AG, Domat/Ems, Switzerland

[21] Appl. No.: 364,252

[22] Filed: Jun. 9, 1989

Related U.S. Application Data

[63] Continuation of Ser. No. 123,936, Nov. 23, 1987, abandoned.

[30] Foreign Application Priority Data

Nov. 25, 1986 [CH] Switzerland .......................... 4709/86

[51] Int. Cl.$^5$ ................................................. C08K 5/29
[52] U.S. Cl. .................................... 524/104; 524/168; 524/195; 525/424
[58] Field of Search ....................... 524/195, 168, 104; 525/424, 907

[56] References Cited

U.S. PATENT DOCUMENTS 4,160,790  7/1979  Mason et al. .......................... 525/179
4,218,549  8/1980  Jadamus et al. ....................... 525/420

Primary Examiner—Lewis T. Jacobs
Attorney, Agent, or Firm—Bierman and Muserlian

[57] ABSTRACT

Molding compositions of thermoplastic plasticizer-containing polyamides exhibit greatly reduced migration of plasticizer or no migration at all due to having 0.1 to 20% by weight of sterically hindered carbodiimides of the formula

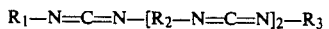

$$R_1-N=C=N-[R_2-N=C=N]_2-R_3$$

wherein n is 0 to 100; $R_1$ and $R_3$ are individually a monovalent radical taken from the class consisting of aliphatic having 1 to 20 carbon atoms, cycloaliphatics having 6 to 20 carbon atoms, and aromatics having 8 to 20 carbon atoms and also having substituents; and $R_2$ is a divalent radical taken from the class consisting of aliphatics having 1 to 20 carbon atoms, cycloaliphatic having 6 to 20 carbon atoms, and aromatics having 8 to 20 carbon atoms and also having substituents.

21 Claims, No Drawings

THERMOPLASTIC PLASTICIZER-CONTAINING POLYAMIDES

PRIOR APPLICATION

This application is a continuation of U.S. patent application Ser. No. 123,936 filed Nov. 23, 1987.

This Application claims the priority of Swiss 4,709/86, filed Nov. 25, 1986.

The invention relates to molding compositions of thermoplastic plasticizer-containing polyamides wherein the migration of the plasticizer is greatly reduced.

BACKGROUND OF THE INVENTION

Polyamides have been widely used, in particular, for industrial applications on account of their properties. However, the rigidity of polyamides is too high for numerous applications, so they are frequently rendered more flexible by the incorporation of plasticizers. Plasticized polyamides are typically found in tubes of the type used in the automobile industry as gasoline lines or in refrigeration units to carry coolants, such as freon. They are also used for the production of shoe soles for sports shoes, as well as skiing and climbing boots.

The plasticizers commonly used have a marked tendency to migrate, and this is a disadvantage because it can lead to the formation of coatings on the plastic articles formed or to a reduction in the flexibility thereof. This migration occurs to a particularly marked extent if polyamide 6 is rendered flexible with caprolactam as plasticizer. Further details about the behaviour of plasticizers in polyamides are given in Vieweg/- Muller "Kunststoff-Handbuch" (Volume VI), Polyamide, Carl-Hanser-Verlag, Munich 1966.

Polycarbodiimides are known as anti-ageing agents for ester group-containing plastic materials (see BE-PS 610,969 and 612 040) and they are also used as oxidation and hydrolysis stabilizers (JP-PA 50-44 and US-PS 3,835,098). In connection with polyamides, DE-PS 1 950 590 describes the use of carbodiimides as cocatalysts during catalytically induced polymerization which takes place within a few minutes. According to DE-OS 2 801 701 and US-PS 4,128,599, the stability of the melt and the viscosity are increased by reaction of the terminal polymer groups with aromatic carbodiimides which either have no substituents or have a single methyl group.

BRIEF DESCRIPTION OF THE INVENTION

The invention is based on the surprising discovery that, by adding the sterically hindered carbodiimides defined above to molding compositions of thermoplastic plasticizercontaining polyamides, the migration of the plasticizer to the surface of shaped articles produced therefrom can be greatly reduced or even avoided. Thus, the formation of a coating of migrated plasticizer, which has an adverse effect on the useful properties of such shaped articles, can be avoided almost completely.

DETAILED DESCRIPTION OF THE INVENTION

The object of the invention is to provide molding compositions containing polyamides and plasticizers in which migration of the plasticizers is prevented or minimized. This object is achieved by providing molding compositions which contain from 0.1 to 20% by weight of sterically hindered carbodiimides of the formula $$R_1-N=C\alpha N-[R_2-N=C=N]_n-R_3$$

wherein n is 0 to 100; $R_1$ and $R_3$ are individually a monovalent radical taken from the class consisting of aliphatics having 1 to 20 carbon atoms, cycloaliphatics having 6 to 20 carbon atoms, and aromatic radicals containing from 6 to 20 carbon atoms and also having substituents, and $R_2$ is a divalent radical taken from the class consisting of aliphatics having 1 to 20 carbon atoms, cycloaliphatic having 6 to 20 carbon atoms, and aromatics having 6 to 20 carbon atoms and also having substituents.

It is preferred that the aliphatics have from 1 to 10 carbon atoms and most preferred that they be from 1 to 5 and 12 to 20 carbon atoms. The cycloaliphatics are preferably from 6 to 10 carbon atoms, most preferably from 6 to 8 carbon atoms.

Particularly suitable aliphatic radicals represented by $R_1$ and $R_3$ in the foregoing general formula include not only optionally substituted ethyl and propyl groups, but also long-chain branched aliphatic materials containing from 12 to 20 carbon atoms. Cyclohexyl groups, which may be substituted in one or several positions, are preferred as the cycloaliphatic radicals for $R_1$ and $R_3$. The substituted aromatic radicals represented by $R_1$ and $R_3$ are preferably phenyl and naphthyl. The substituents on the aromatic radicals are preferably alkylene having 1 to 4 carbon atoms, and are more preferably ethyl, propyl, or isopropyl groups. These aromatic radical are preferably at least disubstituted, with several alkyl groups containing from 2 to 4 carbon atoms, and the corresponding carbodiimides are preferably used in quantities of from 0.1 to 1.5% by weight, based on the entire molding composition. Aromatic poly(polyisopropylphenyl)-carbodiimides wherein n=4 to 25 are particularly suitable for use in the invention; these compounds are preferably used in quantities of 0.5 to 1.2% by weight, based on the entire molding composition.

The sterically hindered carbodiimides and polycarbodiimides of the invention, unlike the carbodiimides without methyl substitutents, rarely polymerise and are preferably present in an isocyanurate carbodiimide equilibrium. They can be produced in known manner from the corresponding sterically hindered isocyanates and polyisocyanates using suitable catalysts (see, for example, FR-PS 1,293,252). Conventional commercial polycarbodiimides, such as, Stabaxol P (manufactured by Rheinchemie) are especially preferred.

Polyamides which are suitable for use in the molding compositions according to the invention include all thermoplastic polyamides, but saturated linear polyamides are preferred. Polycaprolactam (PA 6), polyhexamethylene adipic acid amide (PA 6/6), polyhexamethylene sebacic acid amide, polyhexamethylene azelaic acid amide, polydodecanoamide, and polyundecanoamide, as well as homo- and copolyamides produced using adipic acid, azelaic acid, sebacic acid, dodecanedioic acid, tridecanedioic acid, terephthalic acid, and isophthalic acid on the one hand; and hexamethylene diamine, tetramethylene diamine, trimethylhexamethylene diamine, and/or bis(4-aminocyclohexyl)methane, 2,2,-bis(4-aminocyclohexyl)-propane and alkyl derivatives of the last two, on the other hand. Moreover, copolyamides obtained by polycondensation of lactams together with the above-mentioned dicarboxylic acids and diamines are particularly suitable.

Prefered polyamides are reaction products of a compound taken from the class containing of aliphatic dicarboxylic acids having 6–13 carbon atoms, terephthalic acid, isophthalic acid and mixtures thereof, with at least one diamine. This diamine is preferably taken from the class consisting of hexamethylene diamines and alkyl derivatives thereof, and bis(4-aminocyclohexyl) methane and alkyl derivatives thereof, the alkyl having 1–3 carbon atoms in the alkyl position thereof.

Suitable plasticizers include all plasticizers for molding compositions of thermoplastic polyamides, but n-butylsulfonamide, p-oxybenzoic acid 2-ethylhexyl ester, caprolactam, 2-pyrrolidone, and laurolactam, or mixtures thereof are preferred.

Other specific suitable plasticizers include those taken from the class consisting of aromatic hydroxyl compounds, sulfonic amides, lactams, lactones, partial esters of polyhydric alcohols and mixtures thereof. The plasticizer should comprise 0.5 to 40 percent by weight of the molding composition.

The molding compositions of the present invention can also be modified with other conventional additives; e.g. mineral fillers, fibrous reinforcing materials such as glass fibers and carbon fibers, as well as stabilizers, impact toughness modifiers, dyes, pigments, processing auxiliaries, etc.

The compositions according to the invention can be produced so that their components are mixed in the extruders. They can be processed into useful articles and semi-finished products in the conventional manner using any extrusion devices and injection molding machinery normally suitable for polyamides.

The following Examples illustrate the invention.

EXAMPLES 1 to 3

PA 6, having a relative viscosity of 2.8 (measured as 1% by weight solution in 96% sulphuric acid), together with an ethylene-propylene copolymer grafted with maleic acid anhydride, was melted at 220° to 280° C., in a double shaft extruder, with caprolactam and Stabaxol P (an industrial product containing predominantly polydiisopropyl phenyl derivatives) in accordance with the amounts set forth in Table 1. The extruder was of the ZSK 30 type manufactured by Werner & Pfleiderer of Stuttgart, West Germany. The strands extruded in this way were cooled in a water bath, granulated, and dried. The granulate was extruded to form tubes having dimensions of 8×1 mm. The tubes were stored in a normal environment and coating formation was examined from time to time. The results are set forth in Table 1.

Comparison of the tendency to coating formation shows the advantages of the product according to the invention. The tubes of Example 1 contain 0.6% by weight of carbodiimide (Stabaxol P) and have a much lower tendency to form a coating. The tubes from Example 2 contain 1% by weight of carbodiimide (Stabaxol P) and still have no coating on the surface after storage for 3 years in a normal environment. The tubes from Example 3 (not according to the invention) contain no carbodiimide (Stabaxol P) and have a thick coating on the surface after being stored for only 3 months.

TABLE 1

| | | | Plasticizer migration in PA tubes | | Coating formation on PA-6 tubes during storage in a normal atmosphere after | | |
|---|---|---|---|---|---|---|---|
| Example | PA-6 (% by wt.) | Impact toughness modifier (% by wt.) | prolactam (% by wt.) | Stabaxol P (% by wt.) | 3 months | 1 year | 3 years |
| 1 | 69.4 | 20 | 10 | 0.6 | none | none | slight |
| 2 | 69 | 20 | 10 | 1 | none | none | none |
| 3 | 70 | 20 | 10 | — | thick | not measured | |

I claim:

1. A molding composition consisting essentially of at least one thermoplastic plasticizer-containing polyamide product of the polycondensation of (A) a polyamide selected from the group consisting of polycaprolactam, polyhexamethylene adipic acid amide, polyhexamethylene sebacic acid amide, polyhexamethylene azelaic acid amide, polydodecanoamide, polyundecanoamide; reaction products of adipic acid, azelaic acid, sebacic acid, dodecanedioic acid, tridecanedioic acid, terephathlic acid, and/or isophthalic acid with hexamethylene diamine, tetramethylene diamine, trimethylhexamethylene diamine, bis(4-aminocyclohexyl) methane and alkyl derivatives thereof, 2,2-bis(4-aminocyclohexyl) propane and alkyl derivatives thereof with (B) lactams, and 0.1 to 20% by weight of at least one sterically hindered carbodiimide of the formula

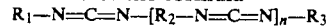

$R_1-N=C=N-[R_2-N=C=N]_n-R_3$ wherein n is 0 to 100; $R_1$ and $R_3$ are individually a monovalent radical taken from the class consisting of aliphatics having 1 to 20 carbon atoms, cycloaliphatics having 6 to 20 carbon atoms, and aromatics having 6 to 20 carbon atoms and also having substituents; and $R_2$ is a divalent radical taken from the class consisting of non-cyclic aliphatics having 1 to 20 carbon atoms, cycloaliphatics having 6 to 20 carbon atoms, and aromatics having 6 to 20 carbon atoms and also having substituents.

2. The composition of claim 1, wherein n is 4 to 25.

3. The composition of claim 1 wherein at least some of said cycloaliphatics are substituted.

4. The composition of claim 1 wherein at least some of said non-cyclic aliphatics have 1 to 10 carbon atoms and at least some of said cycloaliphatics have 6 to 10 carbon atoms.

5. The composition of claim 1 wherein said non-cyclic aliphatics have 1 to 5 carbon atoms or 12 to 20 carbon atoms and said cycloaliphatics have 6 to 8 carbon atoms.

6. The composition of claim 1 wherein said substituents are aliphatic radicals.

7. The composition of claim 1 wherein $R_1$ and $R_3$ are individually taken from the class consisting of substituted or unsubstituted ethyl and propyl groups, branched aliphatic groups having 12 to 20 carbon atoms, and substituted or unsubstituted cyclohexyl groups.

8. The composition of claim 6 wherein said substituents have 1 to 4 carbon atoms.

9. The composition of claim 8 wherein said substituents are ethyl, propyl or isopropyl.

10. The composition of claim 8 wherein said aromatics are disubstituted with alkyl groups having 2 to 4 carbon atoms.

11. The composition of claim 1 wherein said diimide is present in an amount of 0.1 to 1.5% by weight of said composition.

12. The composition of claim 2 wherein said diimide is an aromatic poly(polyisopropylphenyl) carbodiimide and there is 0.5 to 1.2% by weight of said aromatic poly(polyisopropylphenyl)carbodiimide based on said composition.

13. The composition of claim 1 wherein said polyamide is linear and saturated.

14. The composition of claim 1 wherein said polyamide is taken from the class consisting of polycaprolactam, polyhexamethylene adipic acid amide, polyhexamethylene sebacic acid amide, polyhexamethylene azelaic acid amide, polydodecanoamide, polyundecanoamide; reaction products of adipic acid, azelaic acid, sebacic acid, dodecanedioic acid, tridecanedioic acid, terephthalic acid, and/or isophthalic acid with hexamethylene diamine, tetramethylene diamine, trimethylhexamethylene diamine, bis(4-aminocyclohexyl)methane and alkyl derivatives thereof, 2,2-bis(4-aminocyclohexyl)propane and alkyl derivatives thereof.

15. The composition of claim 1 wherein said plasticizer is n-butylsulfonamide, p-oxybenzoic acid 2-ethylhexyl ester, caprolactam, 2-pyrrolidone, or laurolactam.

16. The composition of claim 1 wherein said polyamide is a polymer of a lactam or an ω-aminocarboxylic acid having 6 to 12 carbon atoms.

17. The composition of claim 16 wherein said polyamide is PA-11, PA-12, or mixtures thereof.

18. The composition of claim 1 wherein said plasticizer includes caprolactam, pyrrolidone, or mixtures thereof.

19. The method of molding articles comprising molding the composition of claim 1 into said articles.

20. A molding composition consisting essentially of at least one thermoplastic plasticizer-containing polyamide which is the reaction product of a compound taken from the class consisting of aliphatic dicarboxylic acids having 6 to 13 carbon atoms, terephthalic acid, isophthalic acid and mixtures thereof, with at least one diamine and 0.1 to 20% by weight of at least one sterically hindered carbodiimide of the formula

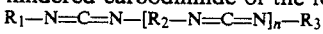

wherein n is 0 to 100; $R_1$ and $R_3$ are individually a monovalent radical taken from the class consisting of aliphatics having 1 to 20 carbon atoms, cycloaliphatics having 6 to 20 carbon atoms, and aromatics having 6 to 20 carbon atoms and also having substituents; and $R_2$ is a divalent radical taken from the class consisting of noncyclic aliphatics having 1 to 20 carbon atoms, cycloaliphatics having 6 to 20 carbon atoms, and aromatics having 6 to 20 carbon atoms and also having substituents.

21. The composition of claim 20 wherein said diamine is taken from the class consisting of hexamethylene diamines and alkyl derivatives thereof, and bis(4-aminocyclohexyl)methane and alkyl derivatives thereof, the alkyl having 1 to 3 carbon atoms in the alkyl portions thereof.

* * * * *